United States Patent Office 3,272,724
Patented Sept. 13, 1966

3,272,724
PROCESS FOR THE RECOVERY OF
HEXAHYDROAZEPINE
George W. Rigby, Wilmington, Del., assignor to E. I. du Pont de Nemours and Company, Wilmington, Del., a corporation of Delaware
No Drawing. Filed Mar. 7, 1963, Ser. No. 263,437
1 Claim. (Cl. 203—81)

This invention relates to the recovery and purification of hexahydroazepine. This compound is also identified as hexamethylenimine.

In present processes for the manufacture of hexamethylenediamine, one of the waste streams typically has the following composition:

Hexahydroazepine __ 3–45% by weight.
$NH_3$ _____ 5–40% by weight.
Miscellaneous
  organics _____ Up to 10% by weight based on the weight of the hexahydroazepine.
Water _____ Up to 100%.

The miscellaneous organics normally comprise extremely small amounts, i.e., on the order of 1% or less, of such materials as hexamethylenediamine, hexylamine, piperidine, pyrrolidine, N-methylpyrrolidine, and the like.

Heretofore, such waste streams have normally been disposed of by burning or otherwise discarded. Normal separation procedures have been unsatisfactory primarily because the hexahydroazepine is completely miscible with water and forms a 50% water azeotrope. It is therefore impractical to recover the hexahydroazepine by normal distillation procedures.

This invention is based on my surprising discovery that, while hexahydroazepine and water are miscible in all proportions at ordinary temperatures, heating mixtures of hexahydroazepine and water to a temperature of about 90–95° C. causes the two materials to become immiscible and form two distinct liquid phases. This is the exact opposite of what one normally expects of miscible substances since it is well known that miscibility of substances ordinarily increases with temperature.

In the practice of my invention, I will ordinarily take the composition identified above and first strip the ammonium by distillation, and secondly take overhead a 50/50 azeotrope of hexahydroazepine and water, which is then condensed by cooling.

The liquid azeotropic fraction is now simply heated, in any convenient vessel, to a temperature of about 90–95° C., whereupon it separates into two clear and distinct phases, which can be separated by decantation, drawing off, or any convenient conventional method. The upper phase is found to be enriched by hexahydroazepine, i.e., contains a higher concentration of hexahydroazepine than the original azeotropic fraction.

This enriched phase can now readily be distilled, sending first overhead a 50/50 azeotrope of hexahydroazepine and water, and leaving behind substantially 100% pure hexahydroazepine. The azeotropic fraction obtained from this distillation procedure can, of course, be heated as described above to separate the two phases and the process repeated sequentially as long as desired.

The process of this invention can be operated successfully with any mixture of water and hexahydroazepine where the concentration of hexahydroazepine is at a level lower than about 57%. In other words, there could be a large excess of water present in the mixture and heating this mixture would effect the two-phase separation with the resulting organic phase containing about 57% hexahydroazepine and about 43% water.

It is interesting to note in my process that, depending on the concentration of the hexahydroazepine and the original mixture with water, upon heating, some phase separation will begin to occur at perhaps as low as 60–65° C., as occurs when the starting material is a 50/50 azeotrope. On the other hand, for a material that is about 98% water or conversely about 98% hexahydroazepine, a clear and distinct two-phase separation may be extremely difficult because of the tendency for the materials to boil off before a neat phase separation can take place.

This invention will be better understood by reference to the following illustrative examples wherein parts are by weight unless indicated otherwise.

Example 1

A liquid which is 50 parts of hexahydroazepine and 50 parts of water is heated to 95° C. at which temperature the liquid separates into two clear and distinct phases. The upper phase is decanted and found to contain 57% by weight of hexahydroazepine and 43% by weight of water. This latter phase is next distilled and the total water content is removed as a 50/50 hexahydroazepine-water azeotrope coming over first, followed by a cut of pure hexahydroazepine. The azeotropic fraction that came overhead first is, if desired, further processed according to this invention simply by heating to about 95° C., decantation of the resulting phase, etc.

Example 2

A waste stream resulting as a by-product from the production of hexamethylene diamine has the following composition:

| | Parts by weight |
|---|---|
| Hexahydroazepine | 19 |
| $NH_3$ | 20 |
| Water | 60 |
| Miscellaneous organics | 1 |

The above composition is distilled to strip the ammonia, followed by taking overhead a fraction of a 50/50 hexahydroazepine-water azeatrope, which is then treated by heating as in Example 1, to obtain a liquid phase which is enriched with hexahydroazepine as in Example 1. This latter material is further processed in accordance with Example 1.

The invention claimed is:

A process for the recovery of hexahydroazepine from a waste stream mixture of about 3 to 45% by weight hexahydroazepine, 5 to 40% by weight ammonia, 9 to 92% by weight water, and 1 to 10% by weight based on the weight of hexahydroazepine of impurities selected from the group consisting of hexamethylenediamine, hexylamine, piperidine, pyrrolidine, N-methylpyrrolidine and their mixtures by the steps of:
  (1) stripping off ammonia by distillation;
  (2) distilling overhead a 50/50 azeotrope of hexahydroazepine and water;
  (3) condensing the overhead stream;
  (4) separating the condensate into two phases one of which is rich in hexahydroazepine, by heating to a temperature of about 90 to 95° C.;
  (5) removing the hexahydroazepine rich phase;
  (6) distilling off a 50/50 azeotrope of hexahydroazepine and water from the hexahydroazepine rich phase leaving behind substantially 100% pure hexahydroazepine.

References Cited by the Examiner

Zil'berman, E. N., et al., Zhurnal Obschei Khimii, 23, No. 7–12, 1953, pages 1629–1930.

REUBEN FRIEDMAN, *Primary Examiner.*

SAM ZAHARNA, *Examiner.*